United States Patent [19]

Lechner et al.

[11] Patent Number: 4,881,226

[45] Date of Patent: Nov. 14, 1989

[54] DIGITAL INTERFACE OF AN INTEGRATED SUBSCRIBER LINE INTERFACE CIRCUIT

[75] Inventors: Robert Lechner, Sankt Poelten, Austria; Hans-Werner Rudolf, Munich, Fed. Rep. of Germany; Harald Stader, Munich, Fed. Rep. of Germany; Norbert Wingerath, Munich, Fed. Rep. of Germany; Christopher C. A. Priest, Maidenhead, United Kingdom; Nigel P. Dyer, London, United Kingdom; Robert K. P. Galpin, Cheshire, United Kingdom; Pierre Albouy, Lannion, France; Robert Le Gougnec, Lannion, France; Ramatchandirane Nadaradjane, Perros-Guirec, France; Marcello Manca, Milan, Italy; Virgilio Mosca, Milan, Italy; Antonio Nicastro, Milan, Italy

[73] Assignee: Siemens Aktiengesellschaft, Berlin and Munich, Fed. Rep. of Germany

[21] Appl. No.: 147,429

[22] Filed: Jan. 25, 1988

[30] Foreign Application Priority Data

Feb. 12, 1987 [DE] Fed. Rep. of Germany ....... 3704408

[51] Int. Cl.$^4$ ............................................... H04J 3/12

[52] U.S. Cl. ................................. 370/110.1; 370/58.1; 379/94

[58] Field of Search ..................... 370/110.1, 68.1, 58, 370/85; 379/399, 93, 94, 338

[56] References Cited

U.S. PATENT DOCUMENTS

4,430,733  2/1984  Hardy et al. ...................... 370/110.1
4,730,308  4/1988  Friedman et al. ..................... 370/85

Primary Examiner—Douglas W. Olms
Assistant Examiner—Frederick R. Jorgenson
Attorney, Agent, or Firm—David N. Caracappa

[57] ABSTRACT

A digital interface of an integrated subscriber line interface circuit is provided. The interface serves for the connection of a signal processor unit. Individual connections are used as signal inputs in signal entry operation of the interface, and as signal outputs in signal transmission operation. Other connections are used as signal inputs in both operating mode, but receive different signals in each operating mode. One group of connections includes two registers with respective associated decoders to enable switching from one to the other, so that the number of operating instructions that can be represented by means of binary signal value combinations applied to the connections is doubled.

5 Claims, 1 Drawing Sheet

DIGITAL INTERFACE OF AN INTEGRATED SUBSCRIBER LINE INTERFACE CIRCUIT

CROSS REFERENCE TO RELATED APPLICATION

Robert Lechner et al., our Case U.S. Ser. No. 07/147,428, filed concurrently with the present application, Digital Interface Between at Least Two Subscriber Line Interface Circuits and a Processing Unit.

BACKGROUND OF THE INVENTION

1. Field of Invention

The present invention relates to a digital interface of an integrated subscriber line interface circuit for the connection of analog telephone subscriber lines of a digital time-multiplex telecommunications network, over which the setting up of various operating conditions of the subscriber line interface circuit is effected and the query of the results of the subscriber line status indications initiated in the subscriber line interface circuit takes place.

2. Description of the Prior Art

With the aid of integrated circuit technology, the space requirements for relatively complex electrical units have been constantlY reduced. A factor that will probably limit this trend is the number of plugs required for such an electrical unit, which, in view of connections that must be made, such as by soldering, cannot be arranged as close to one another as are desirable.

Known integrated circuits and in particular subscriber line interface circuits (SLIC's) are therefore equipped with a serial interface by means of which connections have various kinds of signals applied to them, and they are used to transmit various types of signals, such that the total number of required connections is relatively small in proportion to the number of the various types of signals to be received or transmitted, which results in a longer time in transmitting the signals. In addition, there is an increased circuit expenditure to manage the control of such a serial interface.

The primary object of the present invention is to provide an improved digital interface of the aforementioned type such that the number of connections is less than in prior art parallel interfaces, without the drawbacks of a serial interface.

SUMMARY OF THE INVENTION

The present invention provides a digital interface which is configured as a parallel interface; such that it is provided with a plurality of connections, of which at least one is used in a signal entry operation of the subscriber line interface circuit as a signal input and in a signal transmitting operation of the interface as a data output. The other connections are used as signal inputs in both operating modes, but function at least in part in signal entry operation as inputs for types of signals other than those in signal transmitting operation. A group of the connections functioning as signal inputs receive various types of signals in signal entry and signal transmitting operation, and have at least two registers with a decoder that is coupled as a switch-over mechanism for the selective switching "on" of the registers and the decoder associated with it, such that the possible binary value combinations of the signals at the connections of this group, of which at least one is a switch-over command for the switch-over mechanism, result in more operating instructions for the subscriber line interface unit than would normally be provided for the number of connections of this group.

While the digital interface in accordance with the invention also has connections that are used for more than one type of signal, it is a multiple use, in that they are allocated to one type of signal in signal entry operation and to another type of signal in signal transmitting operation, such that there is no deviation from the concept of the Parallel interface and the aforementioned additional time requirement disadvantage does not arise in this invention. In addition, the use of the registers and the decoder in conjunction with the switch-over mechanism provides a spreading out of the functions of the connections of the subscriber line interface circuit, so that notwithstanding the relatively large number of operating instructions that must be sent to such a unit, it is possible to manage the unit with relatively few connections.

In accordance with another embodiment of the present invention, it is possible, without adverse effect on the time factor, to further increase the number of signals that can be received by a given number of connections, such that a connection that serves Primarily as an input for signals for the switching "on" of signal entry operation and signal transmitting operation can, after the signal entry operation has been switched "On," in conjunction with other connections, be used as an input for operating instructions to the subscriber line unit.

In a further embodiment of the invention, two of the aforementioned registers are provided with a decoder that is coupled thereto, whereby operating instructions received by the connections, if one register is enabled, are instructions to set up operating conditions relating to switching functions of the subscriber line unit, and instructions coming in when the other register is enabled, are instructions for the setting up of various feeding conditions.

The invention is described below, with reference to a specific embodiment and accompanying drawings wherein:

BRIEF DESCRIPTION OF THE INVENTION

DESCRIPTION OF THE PREFERRED EMBODIMENT

Figure 1:
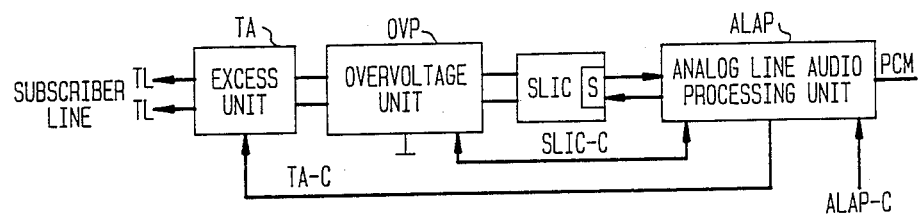
FIG. 1 is a block diagram of a subscriber equipment configuration in which a subscriber line unit representing the interface in accordance with the present invention is included.

FIG. 1 shows the elements required to provide a connection of an analog subscriber line TL to the switching center of a digital time-multiplexed telecommunications system. This includes a subscriber line interface circuit SLIC, which comprises an integrated circuit that is primarily responsible for the feeding of the subscriber line TL, the feeding of ringing current, the feeding of metering pulses, indication of status of the line, and determination of transmission characteristics.

The subscriber line interface circuit operates in conjunction with a unit ALAP, in which the coding and decoding functions as well as the filter functions in connection with the analog signals transmitted to the subscriber line are performed. The ALAP unit, in practice, serves two subscriber lines TL. It is under the control of a microprocessor, (not shown).

The SLIC unit has an interface S for its communication with the ALAP unit, in accordance with the invention.

In addition to the aforementioned elements, FIG. 1 also shows a unit OVP, for the protection of the SLIC unit from overvoltage, which is needed in view of the effects of lightning on the subscriber line TL. A further unit TA functions to carry out tests of both the subscriber line TL and the SLIC unit, which can be controlled by the ALAP unit.

Figure 2:
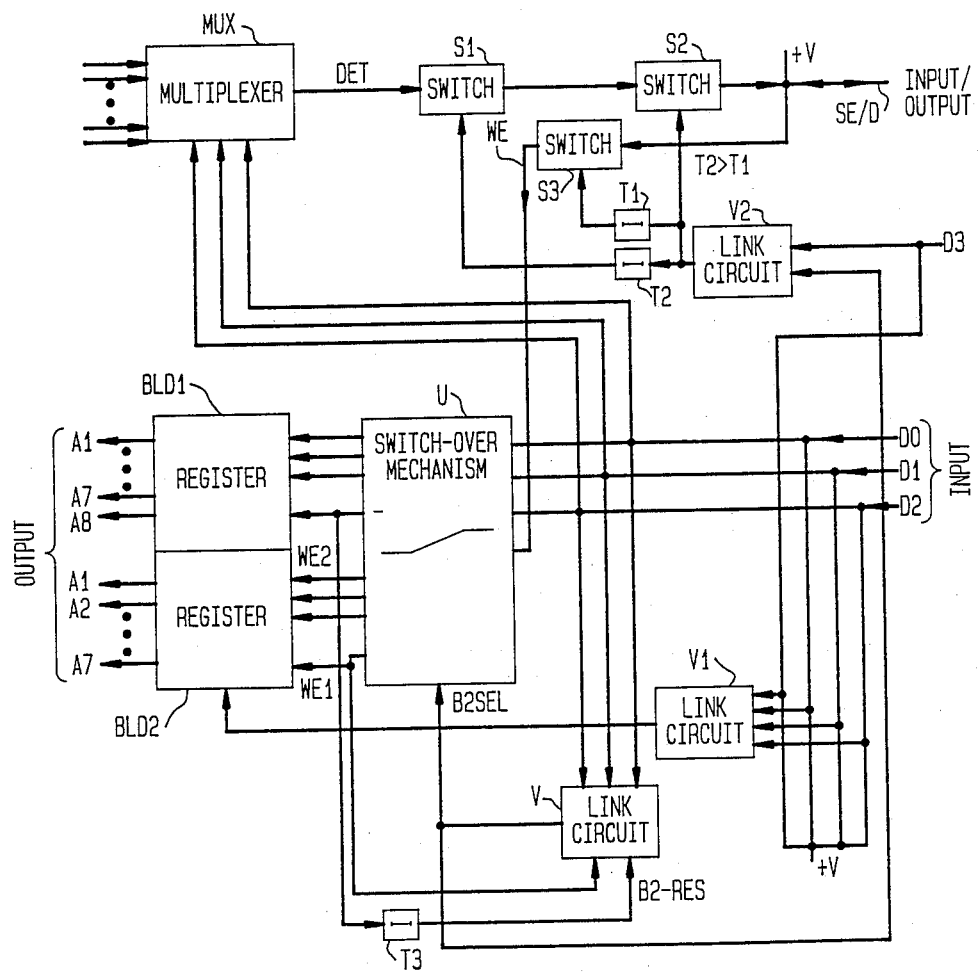
FIG. 2 is a block diagram of the interface in accordance with the Present invention.

FIG. 2 shows the interface S of the SLIC unit described in connection with FIG. 1 in greater detail. These are the four connections, SE/D, D3 and D0 to D2. The connection SE/D functions during signal entry operation of the interface, as a signal input for a signal through which the SLIC unit is placed in operational readiness, which plays an important part when the ALAP 2 unit described with reference to FIG. 1 serves SLIC units, whereby the signal is relayed via a switch S3. During signal transmitting operation of the interface, the SE/D connection serves as a data output, so that data reaches this connection SE/D via the switches S1 and S2. Upon the occurrence of a corresponding signal transmitted by the link circuit V2, the switch S2 is closed immediatelY, while the switch S3, by reason of timing $T_1$, is opened with a delay. Upon the ocurrence of the other corresponding signal at the output of VZ, the switch S1 opens with a delay, the switch S2 opens without a delay, and the switch 3 closes, also with a delay. In this way, undesired overlapping of data going in different transmission directions is avoided.

The remaining connections D3 as well as D0 to D2 are used only as signal inputs, in both signal entry as well as signal transmission operations of the interface. The input D3 serves primarilY for the reception of a signal through which the switching "on" of either signal entry or signal emitting operation is determined. A further use of this input is for the reception of operating instructions, in which this input is coupled to the register MSL.

The inputs D0 to D2 function to receive operating instructions for the subscriber line interface circuit. Two registers, BLD 1 and BLD 2, are coupled to respective decoders coupled to and are associated to the inputs. With the aid of a switch-over mechanism U, these registers can, alternatively, be switched to the aforementioned input connections D0 to D2. Normally, the register BLD I is connected, in which case the binary value combinations at the inputs D0 to D2, after decoding by the abovementioned associated decoder 7, derive various operating instructions that occur at one of the outPuts A1 through A7 of the decoder. These operating instructions are for the setting up of various operating conditions relating to switching functions. The operating conditions relating to switching include the states "ringing" and "ringing pause", as well as operating states during which the direct current supply voltage is operating with one polarity or the other. An eighth of the possible binary value combinations of the signals at the input connections D0 to D2, for example the combination 111, is used as a switch-over command for the switch-over mechanism U, to switch over from the enabling of the first register BLD 1 to the enabling of the second register BLD 2. In this process, the signals at the input connections D0 to D2 are linked by means of a linking member V.

When the second register BLD 2 with its coupled decoder is enabled, which is accomPlished by means of an output signal of the linking member V1 and the linking member V, the possible binary value combinations at the input connections D0 to D2 cause the delivery of operating instructions at the outputs 1 through 7 of the associated decoder, which instructions cause various feeding conditions. Thus it is possible with these instructions to effect a limiting of the supply current, to various degrees. In view of the great length of the connected subscriber lines, the supply voltage may be doubled, and a disconnection of the subscriber line from the subscriber line interface circuit can be effected. The eighth of the possible binary value combinations has not yet been used in the illustrated embodiment.

It will be apparant that because of the use of two registers that can be alternatively allocated to the connections D0 to D2, that twice as many operating instructions can be generated from the eight different binary value combinations made possible by applying digital signals to these connections, so that the ratio of the number of connections to the number of required operating instructions is particularly advantageous. During the signal emitting operation of the subscriber line interface circuit initiated by the application of a corresponding signal to the connection D3, the connection SE/D functions as a data output, as previously described. Specifically, the data supplied are the results of various line status indications; the connection may be queried whether a closed loop exists, or a short circuit to ground, or whether a given current-limiting steP has been taken. These indication results reach the input of a multiplexer MUX. The binary value combinations at the connections D0 to D2 during signal emitting operation function in this process by a querying for certain indication results, or by forwarding them via the connection SE/D.

With the occurrence of a given binary value combination of the signals appearing at all four of connections D3 as well as D0 to D2, which also leads to a switch-over to register BLD 1, the system is placed in stand-by status, which is of significance when the ALAP unit mentioned in connection with FIG. 1 serves 2 SLIC units alternately.

We claim:

1. A digital interface circuit for an integrated subscriber line interface circuit (SLIC) for the connection of analog subscriber lines of a digital time-multiplexed telecommunications network, over which the setting up of various operating conditions of the SLIC is effected and the query of the results of subscriber line status indications initiated in the SLIC occurs, said digital interface circuit comprising:

a parallel interface means having a plurality of input-/output lines of which at least one of said lines is adapted to provide a signal entry operation for the subscriber line interface circuit as a signal input and a signal transmission operation for the subscriber line interface circuit as a data output, and additional lines adapted to provide input signal in both of said operating modes, whereby in signal entry operation said additional lines function as inputs for types of signals other than those types of signals present in signal transmission operation;

means for providing a group of lines adapted to receive input signals in both signal entry and signal transmission operating modes, including at least two registers, each of said registers having respective decoders coupled thereto, and further including a switch-over mechanism for the selective switching "on" of said registers and said associated decoders, whereby the possible binary values of the signals at the input lines to the group provides an increased number of operating instructions for the SLIC.

2. A digital interface circuit in accordance with claim 1 wherein at least one of the types of input signals is a command for said switch-over mechanism.

3. A digital interface circuit in accordance with claim 1, further comprising:
means for providing one of said input connections to receive said signals for the selective switching "on" of the signal entry and signal transmission operations.

4. A digital interface circuit in accordance with claim 3, further including:
input terminals for the reception of binary value combinations which, when coupled to the first register and downstream-connected decoder, derive activating instructions for the switching "on" of a plurality of switching operation states and, when coupled to the second register and downstream-connected decoder together with the binary value of the terminal previously receiving the signal for the switching "on" of the input operation, derive at an output therefrom activating instructions for the switching "on" of a plurality of high and low impedance line feed states.

5. A digital interface circuit in accordance with claim 4 wherein:
the first register and associated decoder include means for causing the binary values at the connections of the aforementioned group of connections to provide operating instructions for the setting up of idle, activated, selection and ringing operating conditions for switching functions; and
means associated with the second register and associated decoder for deriving operating instructions for the setting up of high and low impedance lines feed states.

* * * * *

UNITED STATES PATENT AND TRADEMARK OFFICE
CERTIFICATE OF CORRECTION

PATENT NO. : 4,881,226

DATED : November 14, 1989

INVENTOR(S) : Lechner, et al

It is certified that error appears in the above-identified patent and that said Letters Patent is hereby corrected as shown below:

On the title page:
  Section [73] after "Fed. Rep. of Germany" insert-- Compagnie Industrielle
            Des Telecommunications, Paris, France, GEC Plessey
            Company Plc., Ilford, Essex, United Kingdom; and
            Societe Italiana Telecommunicazioni, S.p.A., Milan,
            Italy--.

Signed and Sealed this

Second Day of July, 1991

*Attest:*

HARRY F. MANBECK, JR.

*Attesting Officer*  *Commissioner of Patents and Trademarks*